United States Patent
Fröhlich et al.

(10) Patent No.: US 8,917,164 B2
(45) Date of Patent: Dec. 23, 2014

(54) METHOD FOR IDENTIFICATION OF COMPONENTS IN AN ELECTRICAL LOW-VOLTAGE SWITCHGEAR ASSEMBLY

(75) Inventors: Paul Fröhlich, Sulzbach-Rosenberg (DE); Peter Thamm, Weinheim (DE)

(73) Assignee: Siemens Aktiengesellschaft, Munich (DE)

( * ) Notice: Subject to any disclaimer, the term of this patent is extended or adjusted under 35 U.S.C. 154(b) by 828 days.

(21) Appl. No.: 12/671,725

(22) PCT Filed: Jun. 24, 2008

(86) PCT No.: PCT/EP2008/058010
§ 371 (c)(1),
(2), (4) Date: Feb. 2, 2010

(87) PCT Pub. No.: WO2009/030533
PCT Pub. Date: Mar. 12, 2009

(65) Prior Publication Data
US 2011/0193690 A1 Aug. 11, 2011

(30) Foreign Application Priority Data
Sep. 3, 2007 (EP) .................................... 07017245

(51) Int. Cl.
*H04Q 5/22* (2006.01)
*H02B 11/02* (2006.01)
*H01H 71/02* (2006.01)

(52) U.S. Cl.
CPC ........... *H01H 71/0271* (2013.01); *H02B 11/02* (2013.01); *H01H 2300/03* (2013.01); *Y02B 90/224* (2013.01); *Y02B 70/3241* (2013.01); *Y04S 20/227* (2013.01); *Y04S 20/14* (2013.01)
USPC ... 340/10.42; 340/10.4; 340/10.1; 340/686.4; 700/291; 700/295

(58) Field of Classification Search
CPC . H05K 7/1457; H05K 7/1488; H05K 7/1421; H05K 7/1492; H05K 7/1498; H05K 7/1438; H05K 5/0252; G06F 1/26; G06F 1/266; G06K 17/00; G06K 2017/0051; H01H 71/02; H02B 1/04
USPC .......... 340/686.1–686.4, 687, 5.8, 5.92, 10.1, 340/10.4, 10.42, 72.1–572.9; 439/38, 43, 439/151, 133, 488, 491; 235/375; 700/291, 700/295
See application file for complete search history.

(56) References Cited

U.S. PATENT DOCUMENTS 6,796,506 B1 * 9/2004 Pradhan et al. .......... 235/462.13
7,350,715 B2 * 4/2008 Pradhan et al. ................ 235/492
(Continued)

FOREIGN PATENT DOCUMENTS

DE 10315646 A1 11/2004
DE 202006000702 U1 4/2007
(Continued)

*Primary Examiner* — Mohammad Ghayour
*Assistant Examiner* — Nay Tun
(74) *Attorney, Agent, or Firm* — Harness, Dickey & Pierce, P.L.C.

(57) ABSTRACT

In one embodiment of the present invention, a method for identification of components in an electrical low-voltage switchgear assembly is disclosed. The electrical low-voltage switchgear assembly according to one embodiment of the invention includes at least one truck module, which can be positioned in a truck slot. In at least one embodiment, both the truck slot and the truck module include associated devices for wire-free communication, wherein the communication devices are designed to transmit and/or receive data which is relevant for an automatic identification of the truck slot and/or the truck module, and allow automatic association of these components with one another.

12 Claims, 2 Drawing Sheets

(56) References Cited

U.S. PATENT DOCUMENTS

| | | |
|---|---|---|
| 7,436,303 B2 * | 10/2008 | Tourrilhes et al. ......... 340/572.1 |
| 7,623,784 B1 * | 11/2009 | Pan et al. ........................ 398/58 |
| 2003/0046339 A1 * | 3/2003 | Ip ................................. 709/203 |
| 2004/0153539 A1 * | 8/2004 | Lyon et al. .................... 709/224 |
| 2004/0168003 A1 * | 8/2004 | Howard et al. ................ 710/62 |
| 2005/0010499 A1 * | 1/2005 | Farkas et al. .................. 705/28 |
| 2006/0097863 A1 * | 5/2006 | Horowitz et al. ............. 340/521 |
| 2007/0055470 A1 * | 3/2007 | Pietrzyk et al. ............... 702/104 |
| 2007/0176782 A1 * | 8/2007 | Mohalik ..................... 340/572.1 |
| 2007/0250410 A1 * | 10/2007 | Brignone et al. ............... 705/28 |

FOREIGN PATENT DOCUMENTS

| | | |
|---|---|---|
| DE | 202007006824 U1 | 7/2007 |
| EP | 1744487 A1 | 1/2007 |

* cited by examiner

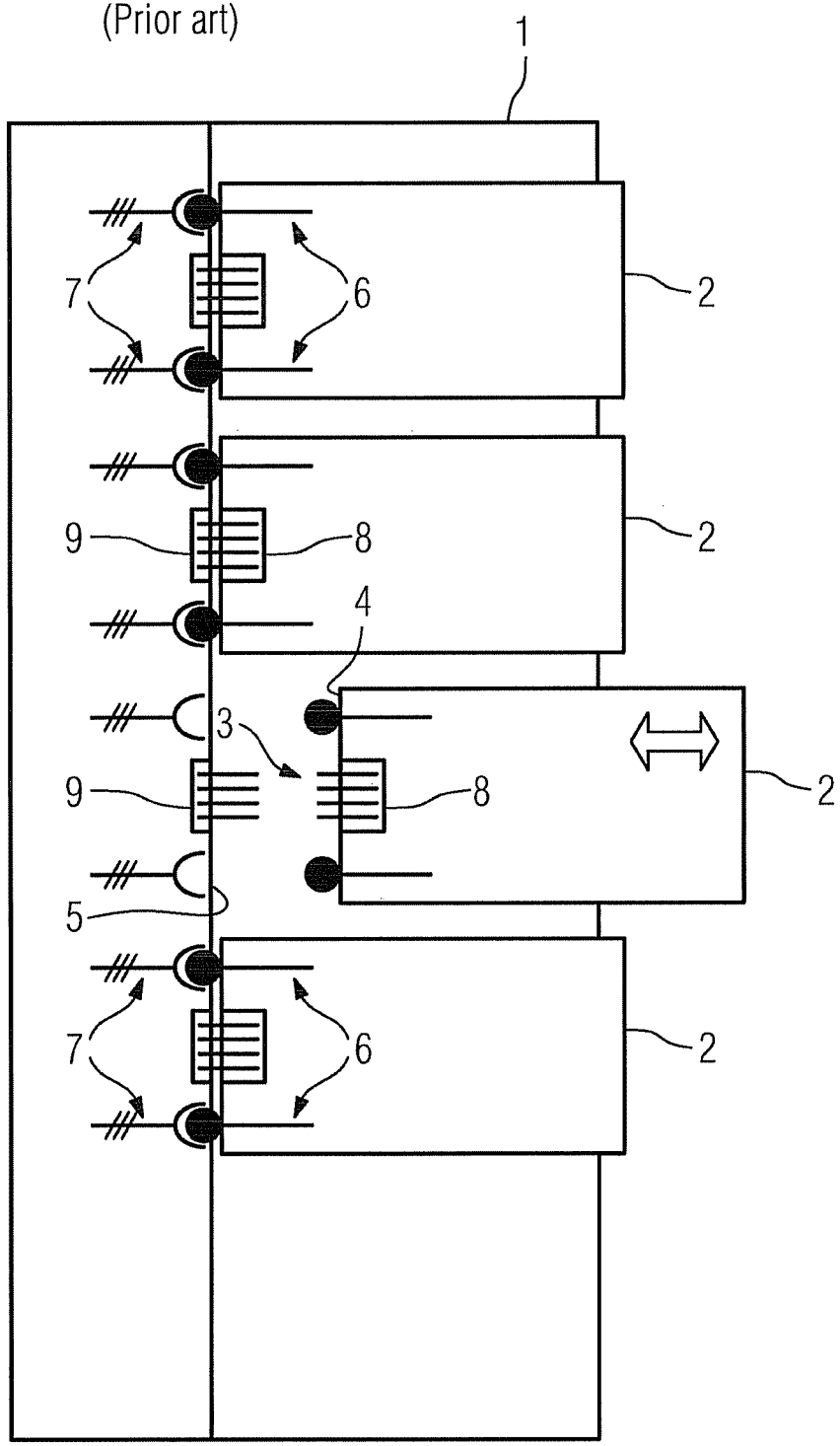

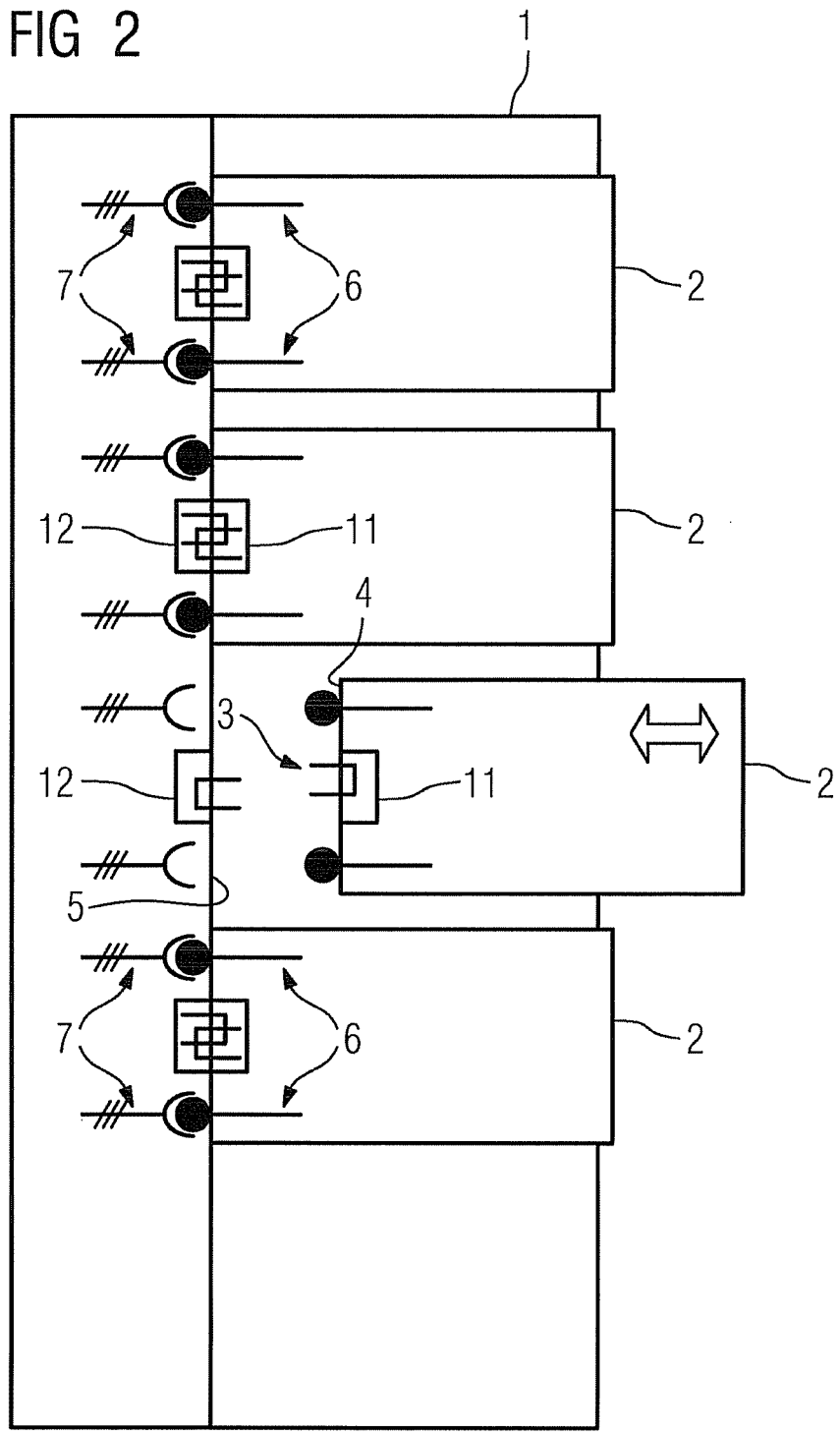

METHOD FOR IDENTIFICATION OF COMPONENTS IN AN ELECTRICAL LOW-VOLTAGE SWITCHGEAR ASSEMBLY

PRIORITY STATEMENT

This application is the national phase under 35 U.S.C. §371 of PCT International Application No. PCT/EP2008/058010 which has an International filing date of Jun. 24, 2008, which designates the United States of America, and which claims priority on European patent application number EP07017245 filed Sep. 3, 2007, the entire contents of each of which are hereby incorporated herein by reference.

FIELD

At least one embodiment of the invention generally relates to a method for identifying components in an electrical low-voltage switchgear assembly. At least one embodiment of the invention also generally relates to an electrical low-voltage switchgear assembly.

BACKGROUND

The use of so-called insertable module technology is known from the field of power distribution and in motor switching units, in other words low-voltage switchgear assemblies for motor branch circuits, the main task of which is to control and protect motors in industrial processes. Every motor branch circuit here is inserted into its own truck module. These truck modules can then be positioned in the manner of drawers in correspondingly provided truck slots. Such motor switching units are also referred to as motor control centers (MCC).

Motor branch circuits can be embodied differently for specific applications. A direct starter, a reversing starter, a star-triangle starter, etc. can be provided from the primary current side. From the control current side the connections to the local control point, the displays, the delay systems, the locking systems, etc. can vary. Despite these different functionalities, the truck modules have the same external structure. Both the external dimensions and the electrical interfaces of the truck modules are a function of the specific characteristics of the motor branch circuit in the interior of the truck module. This can very easily result in incorrect assembly, for example when a motor branch circuit has to be replaced for example due to a short circuit or the end of the service life of the contactors or the circuit breaker. Operational failure or damage to the assembly as a whole can be the result of incorrectly replaced truck modules. It is therefore essential to exclude such confusion reliably, in particular for safety-related motor branch circuits.

To prevent confusion, mechanical coding of the truck modules is known from the prior art. Mechanical coding plugs or coding facilities are deployed here on both components, with the intention of preventing incorrect combination of truck module and truck slot. One disadvantage of the deployment of such coding plugs is however that they only allow a relatively small number of coding options. It is therefore not possible to exclude the risk of incorrect assembly completely in the case of switchgear assemblies with a large number of insertable modules. Also as well as the identification outlay when producing the truck modules there is also a considerable logistics outlay as well as the inspection and test outlay during commissioning, with the result that high preparation and maintenance costs are incurred.

SUMMARY

At least one embodiment of the of the present invention provides a particularly simple and reliable alternative to the coding plugs described above.

According to at least one embodiment of the invention, a method is provided for identifying components in an electrical low-voltage switchgear assembly with at least one truck module that can be positioned in a truck slot. In at least one embodiment of the method, data that is relevant for the identification of the truck slot and/or the truck module is transmitted wirelessly and/or received wirelessly by communication devices, which are associated with the truck module and/or the truck slot and that automatic identification of the truck slot and/or the truck module results, allowing automatic association of said components with one another.

The electrical low-voltage switchgear assembly configured to carry out at least one embodiment of the method has at least one truck module that can be positioned in a truck slot and is characterized in that devices for wireless communication are associated with both the truck slot and the truck module, the communication devices being configured to transmit and/or receive data, which is relevant for automatic identification of the truck slot and/or the truck module and allows automatic association of said components with one another.

The advantages and embodiments described in relation to the switchgear assembly also apply correspondingly to at least one embodiment of the method and vice versa.

An of at least one embodiment of the invention is to transmit data that is relevant for identification wirelessly, thereby allowing precise association of the truck module (and therefore the motor branch circuit or the like disposed therein) with a specific truck slot, in other words a specific insertion point in the switchgear assembly. The deployment of a mechanical coding apparatus, for example a coding plug, is thus superfluous. The communication devices of the truck module and/or truck slot serves as coded "coupling parts".

It is advantageous that the number of "codings" is practically unlimited. Using data that is relevant for identification, the diversity and selection of said data not being limited, allows identification and therefore association processes for any number of components (truck modules, truck slots). Inadequacies of mechanical coding plugs, for example due to mechanical defects or dirt, are a thing of the past. Generally at least one embodiment of the invention provides a particularly simple and also reliable alternative to the coding plugs known from the prior art. The use of at least one embodiment of the invention in motor control centers is particularly advantageous, as there is a great variance here and fast and reliable replacement of the inserts is particularly necessary and desirable.

Therefore with at least one embodiment of the present invention instead of a mechanical coding an electrical wireless coding is deployed to allow association of truck modules with truck slots. It is advantageous here for intelligent truck modules to be used, for example in the form of motor control or motor management systems.

The term "low-voltage switchgear assembly" here refers to switchgear assemblies which are designed to operate at low voltage, in other words a voltage range up to 1000 volts.

The term "data that is relevant for identification" here refers to all data which can serve to identify a component and/or ensure that a number of components interact as required. In particular it is data relating to the type of control functions used (direct starter, reversing starter, etc.), manufacturer-specific attributes (locking systems), branch-specific data (e.g. motor current), time sequences, the history of the truck module, etc.

The data that is relevant for identification is either already stored in the components or is transmitted as required or regularly from an external data source to the components.

The term "truck slot" generally refers, regardless of its specific structural embodiment, to the receiving and/or assembly site of the truck module in the switchgear assembly. The truck slot can therefore also be a holding frame or the like.

Wireless transmission here can be achieved with the aid of a very wide range of technologies. Radio transmission systems, based on RFID or WLAN for example, and optical transmission systems, based on infrared for example, have proved particularly advantageous here. However conventional contactless transmission systems based on magnetic fields or the like can also be used.

It is particularly advantageous if the transmitting and/or receiving of the data that is relevant for identification takes place during or immediately after assembly of the truck module in the truck slot and preferably automatically. In other words the transmitting and/or receiving of this data preferably takes place with a direct temporal relationship to the assembly of the truck module in a truck slot. This ensures that identification and the enabling or blocking of the operation of a specific truck module take place in a timely manner.

While it is essentially open within the context of at least one embodiment of the invention between which objects communication takes place in respect of data that is relevant for identification—provision can be made for example for the truck module to communicate directly with a remotely disposed receiver, for example a central control unit disposed at another point in the switchgear assembly—according to one particularly advantageous embodiment of the invention provision is made for the communication device associated with the truck slot and/or the communication device associated with the truck module to receive data that is relevant for identification from the communication device which is associated with the respectively corresponding component. The corresponding component here is the one with which a bringing together operation is just being carried out in the sense of an assembly. It is possible here both for the communication device associated with the truck slot to receive data that is relevant for identification from the communication device associated with the truck module and for the communication device associated with the truck module to receive data that is relevant for identification from the communication device associated with the truck slot. A data transmission in both directions is also possible and—depending on the application—desirable.

According to at least one embodiment of the invention both "passive" and also "active coding" can therefore take place. "Passive coding" here refers to a configuration in which the communication device associated with the generally fixed truck slot is only present as a "passive" component, which is addressed, in some instances supplied with power and "read" by an "active" component, in this instance the movable truck module. One example of such "passive coding" is the use of radio frequency identification (RFID) technology, which is known per se. This is particularly suitable for safety-related applications, as the risk of external influences, for example due to magnetic fields, is minor. Other examples of "passive coding" are the use of an oscillating circuit or a magnetic switch, the structure and function of which are common practice for the person skilled in the art.

"Active coding" here refers to a configuration in which both the communication device associated with the truck slot and the communication device associated with the truck module are able to function independently of one another, in particular are supplied with power themselves. One example of such "active coding" is the use of a radio or infrared transmission technology or the like known per se with two autonomous transmit and/or receive units.

According to a further embodiment of the invention the communication device associated with the truck slot and/or the communication device associated with the truck module transmits the data that is relevant for identification to a local enabling unit associated with the truck slot and/or the truck module and/or to a remote enabling unit associated with the truck slot and/or the truck module. In other words it is possible both for the communication device associated with the truck module to transmit the data that is relevant for identification to a local and/or remote enabling unit associated with the truck module and for the communication device associated with the truck slot to transmit the data that is relevant for identification to a local and/or remote enabling unit associated with the truck slot.

The enabling unit, in other words the means for automatic identification of the truck slot and/or truck module, is preferably a data processing apparatus, which is configured to execute a computer program for identifying and enabling components. To this end the data processing apparatus is provided with at least one microprocessor, a data storage unit, a data input apparatus, a data output apparatus and corresponding data transmission apparatuses between said component parts.

The truck module and/or the truck slot is/are preferably enabled to operate with the corresponding component when verification of the identification-related data has been completed successfully. Otherwise the truck module and/or the truck slot remain(s) or is/are blocked for such operation. The decision regarding enabling is made taking into account data that is relevant for identification in the enabling unit.

It is particularly advantageous if the truck module and/or the truck slot is/are adapted to operate with the corresponding component before enabling takes place. In other words modification of the truck slot and/or the truck component can take place immediately after identification of the components and before they are enabled. This is particularly advantageous if the component would not be capable of correct operation without such a modification and only the modification allows such operation. Component identification in this instance serves primarily to determine the extent to which modification has to be carried out. The modification itself, which preferably proceeds automatically, does not have to comprise changes to the assembly. It is often sufficient to adapt individual components of the truck module and/or the truck slot to the requirements of the specific individual instance, e.g. to adapt the communication protocol for the truck slot.

It therefore lies within the scope of at least one embodiment of the invention in this context to supply a component disposed in the truck module, for example a motor branch circuit, with suitable operating parameters or other data as a function of the insertion site, i.e. as a function of the truck slot used. It is also possible to embody all the available truck slots in a basic constellation as "neutral" and only adapt them further to the assembly of a specific truck module to the requirements relating to the operation of said truck module. For example the motor current can be adapted to the protection facility or there can be an adaptation to the user address of the truck module.

The embodiments of the invention mentioned just above can be realized particularly simply and advantageously both when using RFID and also with "active coding".

After enabling has taken place, the truck module and/or the truck slot is preferably supplied with data which is adapted to operation with the corresponding component. The general nature and manner of component operation can also be adapted to the characteristics of the components used.

Generally a very flexible solution results, which can be easily adapted to the requirements of the respective application and which can be realized with little technical outlay. Additional advantages result from the high information density of the coding material, e.g. when using RFID technology and "active coding". Thus for example group codings can be defined and/or parameters also transmitted, for example the address of the corresponding component in communication-enabled systems, in other words systems in which communication takes place between truck modules and truck slots on the one hand and a central controller or the like on the other hand by way of a bus system, in particular a field bus system, for example PROFIBUS or PROFINET.

BRIEF DESCRIPTION OF THE DRAWINGS

The invention is described below with reference to an example embodiment which is explained in more detail with the aid of drawings showing simplified, in some instances schematic diagrams, in which:

FIG. 1 shows a switchgear assembly according to the prior art and

FIG. 2 shows an inventive switchgear assembly.

In the figures described below identical reference characters correspond to elements of identical or comparable function.

DETAILED DESCRIPTION OF THE EXAMPLE EMBODIMENTS

Insertable motor control centers 1 are known. A number of truck modules 2 are provided here, which can be positioned in truck slots 3. Each truck module 2 here contains a motor branch circuit for example. To realize the primary current circuit and the control current circuit vertical plug-on buses or plug-type connectors 6, 7 or a different type of suitable connecting element are provided both on the rear faces 4 of the truck modules 2 and also on the rear faces 5 of the truck slots 3, which are formed by the rear wall of the motor control center 1, and these interact in the assembled state. These plug-type connectors 6, 7 essentially serve to transmit primary current (e.g. 400 V), to transmit auxiliary power (control power) to supply the devices and apparatuses contained in the truck module and for the purposes of communication between the truck module 2 on the one hand and the truck slot 3 and therefore the switchgear assembly on the other hand, in particular to transmit actuation signals, return information, error signals, etc., e.g. by way of a field bus system.

Mutually adapted mechanical coding plugs 8, 9 are also provided, as shown in FIG. 1, on the rear faces 4 of the truck modules 2 and also on the rear faces 5 of the truck slots 3, to ensure that operation of a specific truck module 2 is only possible in a truck slot 3 intended for this purpose. If the coding plugs 8, 9 do not correspond, complete insertion of the truck module 2 into the truck slot 3 is not possible, so that contacting of the vertical plug-on buses or plug-type connectors 6, 7 and therefore operation are not possible.

Instead of the coding plugs 8, 9 shown in FIG. 1, an embodiment of the invention provides for wireless coding, see FIG. 2. The interacting vertical plug-on buses or plug-type connectors 6, 7 serving to transmit primary current, auxiliary power and for communication purposes between the truck module 2 and the truck slot 3 are—as in the prior art—provided both on the rear faces 4 of the truck modules 2 and on the rear faces 5 of the truck slots 3.

However devices 11, 12 for wireless communication replace the coding plugs 8, 9. These communication devices 11, 12 are configured to transmit and/or receive data, which is relevant for the identification of the truck slot 3 and/or the truck module 2. The communication devices 11, 12 in the embodiment described here are associated with both the truck modules 2 and the truck slots 3. In this specific instance association is such that the communication devices 11, 12—like the coding plugs 8, 9 before—are secured to the rear faces 4 of the truck modules 2 and to the rear faces 5 of the truck slots 3. With such an arrangement the smallest possible gap is achieved between interacting communication devices 11, 12 in the assembled state, so that the communication devices 11, 12 used operate for example at low transmit powers and only require transmit and receive apparatuses with correspondingly small dimensions. This allows the motor control center 1 to have a particularly compact structure. It also reduces the material outlay for the communication devices 11, 12 and therefore their production costs.

However the association of the communication devices 11, 12 with the components 2, 3 can also be provided for differently. It is for example thus not essential for the communication devices 11, 12 to be connected directly to the components 2, 3. A loose association of the communication devices 11, 12 with the components 2, 3 is also possible. A receiver and/or transmitter can therefore be unconnected in a truck module 2. Remote positioning of the communication devices 11, 12 is also possible, even outside the components 2, 3. Such remote positioning is possible if unique association with a specific component 2, 3 has been established.

In the example embodiment shown the first communication device 11 associated with the truck module 2 receives data that is relevant for identification, in particular a unique position ID (slot ID) from the second communication device 12 associated with the truck slot 3. More precisely data that is relevant for the identification of the truck slot 3 is requested by way of a first RFID module associated with the truck module 2 as part of the first communication device 11 from a second RFID module associated with the truck slot 3 as part of the second communication device 12. In this process the second RFID module is supplied with power by way of the first RFID module ("passive coding").

The second RFID module, which is associated with the truck slot 3, here comprises an RFID transponder, in the storage unit of which the first data (slot ID) that is relevant for identification is stored. The first RFID module, which is associated with the truck module 2, includes an RFID read device. The RFID read device automatically generates a high-frequency electromagnetic alternating field when approaching the RFID transponder as the truck module 2 is inserted into the truck slot 3 and this is received by an antenna of the RFID transponder. The current thus induced causes the microchip in the RFID transponder to be activated and the data of relevance for identification stored there is transmitted to the RFID read device.

The first communication device 11 associated with the truck module 2 then transmits the received data that is relevant for identification to a local enabling unit associated with the truck module 2, i.e. an enabling unit configured as part of the truck module 2, which is configured as a data processing apparatus. The data that is relevant for identification is processed there with the aid of a computer program, which is loaded in the storage unit of the data processing apparatus and executed for this purpose.

Once the data that is relevant for identification has been verified, the truck module 2 is enabled to operate with the corresponding truck slot 3, if such operation is allowed. Alternatively the truck module 2 is blocked or remains blocked for such operation, depending on the presetting. It is particularly advantageous if the first communication device 11 in this instance sends a corresponding message—preferably stating the current insertion site of the truck module 2—to an external receiver, for example to the central control unit of the motor control center 1 or the like. If it is a communication-enabled switchgear assembly and this has not yet been done, corresponding address information is transmitted to the truck module 2 from the communication device 12 associated with the truck slot 3, allowing the truck module 2 to be located in the motor control center 1.

In some instances it may be necessary before enabling to modify the truck module 2 and/or the truck slot 3, in particular here the parameters for the transmission of primary current, auxiliary power and communication (protocols, etc.). In the case of a communication-enabled switchgear assembly the changes required for this purpose are preferably made by the central control unit of the motor control center 1.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for identifying components in an electrical low-voltage switchgear assembly associated with at least one truck module which is positionable in a truck slot, the method comprising:
   transmitting data by a first wireless communication device associated with one of the truck slot and the truck module, relevant for the identification of at least one of the truck slot and the truck module at least one of during and after assembly of the truck module in the truck slot, wirelessly;
   receiving the data wirelessly by a second wireless communication device associated with the other of the truck slot and the truck module at least one of during and after assembly of the truck module in the truck slot, such that automatic identification of at least one of the truck slot and the truck module results, allowing automatic association of the truck module and the truck slot with one another;
   transmitting the received data to a data processing unit;
   determining whether to enable the truck module to operate in the truck slot in the electrical low-voltage switchgear assembly based on the transmitted and received data at least one of during and after assembly of the truck module in the truck slot; and
   supplying the truck module with suitable operating parameters as a function of the truck slot in which the truck module is positioned based on the identification data when operation of the truck module is not enabled at least one of during and after assembly of the truck module in the truck slot, wherein the identification data includes information required to determine whether modification of the truck module is required to be operable in the truck slot.

2. The method as claimed in claim 1, wherein the communication device associated with the truck slot receives data that is relevant for identification of the truck module from the communication device associated with the truck module and the communication device associated with the truck module receives data that is relevant for identification of the truck slot from the communication device which is associated with the truck slot.

3. The method as claimed in claim 2, wherein transmitting the received data includes transmitting the received data to at least one of a local enabling unit that is in the at least one of the truck slot and the truck module.

4. The method as claimed in claim 3, wherein at least one of the truck module and the truck slot is enabled to operate with the corresponding component upon verification of the identification-related data being completed successfully.

5. The method as claimed in claim 4, wherein, after enabling has taken place, at least one of the truck module and the truck slot is supplied with data which is adapted to operation with the corresponding component.

6. The method as claimed in claim 4, wherein, upon verification of the identification-related data not being completed successfully, at least one of the truck module and the truck slot remains or is blocked for such operation.

7. The method as claimed in claim 3, wherein at least one of the truck module and the truck slot is adapted for operation with the other of the truck module and the truck slot before enabling takes place.

8. The method as claimed in claim 7, wherein, after enabling has taken place, at least one of the truck module and the truck slot is supplied with data which is adapted to operation with the corresponding component.

9. An electrical low-voltage switchgear assembly for at least one truck module which is positionable in a truck slot, comprising:
   a first wireless communication module associated with a truck module housed in the low-voltage switchgear assembly; and
   a second wireless communication module associated with a truck slot housed in the low-voltage switchgear assembly, wherein
   the first and second communication modules are configured to at least one of transmit and receive data, relevant for automatic identification of at least one of the truck slot and the at least one truck module, to allow automatic association of the truck slot and the at least one truck module with one another and to determine whether to enable the truck module to operate in the truck slot in the electrical low-voltage switchgear assembly based on the transmitted and received data at least one of during and after assembly of the truck module in the truck slot, and
   at least one of the first and second communication modules is configured to supply the truck module with suitable operating parameters as a function of the truck slot in which the truck module is positioned based on the identification data at least one of during and after assembly of the truck module in the truck slot, wherein the data includes information required to determine whether modification of the truck module is required to be operable in the truck slot.

10. The electrical low-voltage switchgear assembly as claimed in claim 9, further comprising at least one of:
   a local enabling unit associated with at least one of the truck slot and the at least one truck module, and
   a remote enabling unit associated with at least one of the truck slot and the at least one truck module,
   the local enabling unit and the remote enabling unit being configured to verify the data that is relevant for automatic identification and to make a decision regarding the enabling of at least one of the truck slot and the at least one truck module.

11. A method for an electrical low-voltage switchgear assembly associated with at least one truck module which is positionable in a truck slot, the method comprising:
receiving data, relevant for the identification of at least one of the truck slot and the at least one truck module at least one of during and after assembly of the truck module in the truck slot, wirelessly at communication devices, the communication devices being respectively associated with the truck module and the truck slot, such that automatic identification of at least one of the truck slot and the truck module results, allowing automatic association of the truck module and the truck slot with one another;
determining whether to enable the truck module to operate in the truck slot in the electrical low-voltage switchgear assembly based on the transmitted and received data at least one of during and after assembly of the truck module in the truck slot; and
supplying the truck module with suitable operating parameters as a function of the truck slot in which the truck module is positioned based on the identification data when operation of the truck module is not enabled at least one of during and after assembly of the truck module in the truck slot, wherein the identification data includes information required to determine whether modification of the truck module is required to be operable in the truck slot.

12. The method as claimed in claim 2, wherein transmitting the received data includes transmitting the received data to a remote enabling unit associated with at least one of the truck slot and the truck module.

* * * * *